United States Patent
Kumar et al.

(10) Patent No.: US 7,327,998 B2
(45) Date of Patent: Feb. 5, 2008

(54) SYSTEM AND METHOD OF PROVIDING A GEOGRAPHIC VIEW OF NODES IN A WIRELESS NETWORK

(75) Inventors: Navaneet Kumar, Cary, NC (US); Raymond Kelley, Raleigh, NC (US); Dileep Rudran, Cary, NC (US); Sean M. Scoggins, Raleigh, NC (US)

(73) Assignee: Elster Electricity, LLC, Raleigh, NC (US)

( * ) Notice: Subject to any disclaimer, the term of this patent is extended or adjusted under 35 U.S.C. 154(b) by 81 days.

(21) Appl. No.: 11/020,694

(22) Filed: Dec. 22, 2004

(65) Prior Publication Data

US 2006/0135119 A1    Jun. 22, 2006

(51) Int. Cl.
*H04M 11/00* (2006.01)

(52) U.S. Cl. .................. 455/405; 455/405; 340/870; 345/440; 345/419; 707/104.1; 709/224

(58) Field of Classification Search ................ 455/406, 455/457, 405; 709/224; 345/419; 707/104.1
See application file for complete search history.

(56) References Cited

U.S. PATENT DOCUMENTS

| | | | |
|---|---|---|---|
| 3,455,815 A | 7/1969 | Saltzberg et al. | 340/163 |
| 3,858,212 A | 12/1974 | Tompkins et al. | 343/100 CS |
| 3,878,512 A | 4/1975 | Kobayashi et al. | 340/168 R |
| 3,973,240 A | 8/1976 | Fong | 340/151 |
| 4,031,513 A | 6/1977 | Simciak | 340/152 T |
| 4,056,107 A | 11/1977 | Todd et al. | 130/27 |
| 4,066,964 A | 1/1978 | Costanza et al. | 325/55 |
| 4,132,981 A | 1/1979 | White | 340/203 |
| 4,190,800 A | 2/1980 | Kelly, Jr. et al. | 325/37 |
| 4,204,195 A | 5/1980 | Bogacki | 340/151 |
| 4,218,737 A | 8/1980 | Buscher et al. | 364/493 |
| 4,250,489 A | 2/1981 | Dudash et al. | 340/147 |
| 4,254,472 A | 3/1981 | Juengel et al. | 364/900 |
| 4,319,358 A | 3/1982 | Sepp | 375/1 |
| 4,321,582 A | 3/1982 | Banghart | 340/310 |
| 4,322,842 A | 3/1982 | Martinez | 370/204 |
| 4,328,581 A | 5/1982 | Harmon et al. | 371/8 |
| 4,361,851 A | 11/1982 | Asip et al. | 358/84 |

(Continued)

FOREIGN PATENT DOCUMENTS

CH    682196 A5    7/1993

(Continued)

OTHER PUBLICATIONS

Desbonnet, Joe et al., "System Architecture and Implementation of CEBus/Internet Gateway", *IEEE*, 1997, 1057-1062, no month listed.

(Continued)

*Primary Examiner*—Lester G. Kincaid
*Assistant Examiner*—Charles Shedrick
(74) *Attorney, Agent, or Firm*—Woodcock Washburn LLP

(57) ABSTRACT

A geographic view rendering tool receives geographic location data for nodes in a wireless network and renders a geographic view displaying the nodes at their corresponding geographic locations. The geographic view may be displayed overlaying a digital map. The geographic view may also display network information such as, for example, node connections data, communication success rates for the nodes, and occurrences of communications events at the nodes. The nodes may be displayed in a manner representative of corresponding network information using, for example, a variety colors and icons.

44 Claims, 6 Drawing Sheets

U.S. PATENT DOCUMENTS

| | | | |
|---|---|---|---|
| 4,361,890 A | 11/1982 | Green, Jr. et al. | 375/1 |
| 4,396,915 A | 8/1983 | Farnsworth et al. | 340/870.03 |
| 4,405,829 A | 9/1983 | Rivest et al. | 178/22.14 |
| 4,415,896 A | 11/1983 | Allgood | 340/870.03 |
| 4,466,001 A | 8/1984 | Moore et al. | 340/825.08 |
| 4,504,831 A | 3/1985 | Jahr et al. | 340/870.03 |
| 4,506,386 A | 3/1985 | Ichikawa et al. | 455/343 |
| 4,513,415 A | 4/1985 | Martinez | 370/92 |
| 4,525,861 A | 6/1985 | Freeburg | 455/33 |
| 4,600,923 A | 7/1986 | Hicks et al. | 340/870.02 |
| 4,608,699 A | 8/1986 | Batlivala et al. | 375/216 |
| 4,611,333 A | 9/1986 | McCallister et al. | 375/1 |
| 4,614,945 A | 9/1986 | Brunius et al. | 340/870.03 |
| 4,617,566 A | 10/1986 | Diamond | 340/870.11 |
| 4,628,313 A | 12/1986 | Gombrich et al. | 340/870.02 |
| 4,631,538 A | 12/1986 | Carreno | 340/870.18 |
| 4,638,298 A | 1/1987 | Spiro | 340/827 |
| 4,644,321 A | 2/1987 | Kennon | 340/310 |
| 4,653,076 A | 3/1987 | Jerrim et al. | 375/115 |
| 4,672,555 A | 6/1987 | Hart et al. | 700/276 |
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825 |
| 4,707,852 A | 11/1987 | Jahr et al. | 379/107 |
| 4,713,837 A | 12/1987 | Gordon | 379/93 |
| 4,724,435 A | 2/1988 | Moses et al. | 340/870.13 |
| 4,728,950 A | 3/1988 | Hendrickson et al. | 340/870.31 |
| 4,734,680 A | 3/1988 | Gehman et al. | 340/539 |
| 4,749,992 A | 6/1988 | Fitzmeyer et al. | 340/870.02 |
| 4,757,456 A | 7/1988 | Benghiat | 364/464 |
| 4,769,772 A | 9/1988 | Dwyer | 364/300 |
| 4,783,748 A | 11/1988 | Swarztrauber et al. | 364/483 |
| 4,792,946 A | 12/1988 | Mayo | 370/338 |
| 4,799,059 A | 1/1989 | Grindahl et al. | 340/870.02 |
| 4,804,938 A | 2/1989 | Rouse et al. | 340/310 |
| 4,811,011 A | 3/1989 | Sollinger | 340/870.02 |
| 4,827,514 A | 5/1989 | Ziolko et al. | 380/48 |
| 4,833,618 A | 5/1989 | Verma et al. | 364/483 |
| 4,839,645 A | 6/1989 | Lill | 340/870.17 |
| 4,841,545 A | 6/1989 | Endo et al. | 375/1 |
| 4,860,379 A | 8/1989 | Schoeneberger et al. | 455/5 |
| 4,862,493 A | 8/1989 | Venkataraman et al. | 379/107 |
| 4,868,877 A | 9/1989 | Fischer | 380/25 |
| 4,884,021 A | 11/1989 | Hammond et al. | 324/142 |
| 4,912,722 A | 3/1990 | Carlin | 375/1 |
| 4,922,518 A | 5/1990 | Gordon et al. | 379/57 |
| 4,939,726 A | 7/1990 | Flammer et al. | 370/94.1 |
| 4,940,974 A | 7/1990 | Sojka | 340/825.08 |
| 4,940,976 A | 7/1990 | Gastouniotis et al. | 340/870.02 |
| 4,958,359 A | 9/1990 | Kato | 375/1 |
| 4,964,138 A | 10/1990 | Nease et al. | 375/1 |
| 4,965,533 A | 10/1990 | Gilmore | 331/18 |
| 4,972,507 A | 11/1990 | Lusignan | 455/51 |
| 5,007,052 A | 4/1991 | Flammer | 370/85.6 |
| 5,018,165 A | 5/1991 | Sohner et al. | 375/1 |
| 5,022,046 A | 6/1991 | Morrow, Jr. | 375/1 |
| 5,032,833 A | 7/1991 | Laporte | 340/825.02 |
| 5,053,766 A | 10/1991 | Ruiz-del-Portal et al. | 340/870.02 |
| 5,053,774 A | 10/1991 | Schuermann et al. | 342/44 |
| 5,056,107 A | 10/1991 | Johnson et al. | 375/1 |
| 5,067,136 A | 11/1991 | Arthur et al. | 375/1 |
| 5,079,715 A | 1/1992 | Venkataraman et al. | 364/481 |
| 5,079,768 A | 1/1992 | Flammer | 370/94.1 |
| 5,086,292 A | 2/1992 | Johnson et al. | 340/637 |
| 5,086,385 A | 2/1992 | Launey | 364/188 |
| 5,090,024 A | 2/1992 | Vander Mey et al. | 375/1 |
| 5,111,479 A | 5/1992 | Akazawa | 375/1 |
| 5,115,433 A | 5/1992 | Baran et al. | 370/94.3 |
| 5,115,448 A | 5/1992 | Mori | 375/1 |
| 5,129,096 A | 7/1992 | Burns | 455/18 |
| 5,130,987 A | 7/1992 | Flammer | 370/103 |
| 5,132,985 A | 7/1992 | Hashimoto et al. | 375/1 |
| 5,136,614 A | 8/1992 | Hiramatsu et al. | 375/1 |
| 5,142,694 A | 8/1992 | Jackson et al. | 455/67.1 |
| 5,151,866 A | 9/1992 | Glaser et al. | 364/483 |
| 5,155,481 A | 10/1992 | Brennan, Jr. et al. | 340/870.02 |
| 5,160,926 A | 11/1992 | Schweitzer, III | 340/870.02 |
| 5,166,664 A | 11/1992 | Fish | 340/539 |
| 5,177,767 A | 1/1993 | Kato | 375/1 |
| 5,179,376 A | 1/1993 | Pomatto | 340/870.02 |
| 5,189,694 A | 2/1993 | Garland | 379/106 |
| 5,194,860 A | 3/1993 | Jones et al. | 340/370.02 |
| 5,197,095 A | 3/1993 | Bonnett | 379/107 |
| 5,204,877 A | 4/1993 | Endo et al. | 375/1 |
| 5,214,587 A | 5/1993 | Green | 364/464.04 |
| 5,225,994 A | 7/1993 | Arinobu et al. | 364/492 |
| 5,228,029 A | 7/1993 | Kotzin | 370/95.1 |
| 5,229,996 A | 7/1993 | Bäckström et al. | 370/100.1 |
| 5,239,575 A | 8/1993 | White et al. | 379/107 |
| 5,239,584 A | 8/1993 | Hershey et al. | 380/28 |
| 5,243,338 A | 9/1993 | Brennan, Jr. et al. | 340/870.02 |
| 5,252,967 A | 10/1993 | Brennan et al. | 340/870.02 |
| 5,260,943 A | 11/1993 | Comroe et al. | 370/95.1 |
| 5,270,704 A | 12/1993 | Sosa Quintana et al. | 340/870.02 |
| 5,280,498 A | 1/1994 | Tymes et al. | 375/1 |
| 5,280,499 A | 1/1994 | Suzuki | 375/1 |
| 5,285,469 A | 2/1994 | Vanderpool | 375/1 |
| 5,287,287 A | 2/1994 | Chamberlain et al. | 364/483 |
| 5,289,497 A | 2/1994 | Jacobson et al. | 375/1 |
| 5,295,154 A | 3/1994 | Meier et al. | 375/1 |
| 5,307,349 A | 4/1994 | Shloss et al. | 370/85.2 |
| 5,311,541 A | 5/1994 | Sanderford, Jr. | 375/1 |
| 5,311,542 A | 5/1994 | Eder | 375/1 |
| 5,315,531 A | 5/1994 | Oravetz et al. | 364/550 |
| 5,319,679 A | 6/1994 | Bagby | 375/106 |
| 5,329,547 A | 7/1994 | Ling | 375/1 |
| 5,345,225 A | 9/1994 | Davis | 340/635 |
| 5,359,625 A | 10/1994 | Vander Mey et al. | 375/1 |
| 5,377,222 A | 12/1994 | Sanderford, Jr. | 375/1 |
| 5,381,462 A | 1/1995 | Larson et al. | 379/107 |
| 5,383,134 A | 1/1995 | Wrzesinski | 364/514 |
| 5,384,712 A | 1/1995 | Oravetz et al. | 364/550 |
| 5,387,873 A | 2/1995 | Muller et al. | 327/155 |
| 5,390,360 A | 2/1995 | Scop et al. | 455/34.2 |
| 5,406,495 A | 4/1995 | Hill | 364/483 |
| 5,416,917 A | 5/1995 | Adair et al. | 395/500 |
| 5,420,799 A | 5/1995 | Peterson et al. | 364/483 |
| 5,428,636 A | 6/1995 | Meier | 375/202 |
| 5,430,759 A | 7/1995 | Yokev et al. | 375/202 |
| 5,432,507 A | 7/1995 | Mussino et al. | 340/870.03 |
| 5,432,815 A | 7/1995 | Kang et al. | 375/200 |
| 5,438,329 A | 8/1995 | Gastouniotis et al. | 340/870.02 |
| 5,448,230 A | 9/1995 | Schanker et al. | 340/870.03 |
| 5,448,570 A | 9/1995 | Toda et al. | 370/95.3 |
| 5,450,088 A | 9/1995 | Meier et al. | 342/51 |
| 5,452,465 A | 9/1995 | Geller et al. | 395/800 |
| 5,455,533 A | 10/1995 | Köllner | 327/484 |
| 5,455,544 A | 10/1995 | Kechkaylo | 332/103 |
| 5,455,569 A | 10/1995 | Sherman et al. | 340/825.02 |
| 5,455,822 A | 10/1995 | Dixon et al. | 370/18 |
| 5,457,713 A | 10/1995 | Sanderford, Jr. et al. | 375/206 |
| 5,461,558 A | 10/1995 | Patsiokas et al. | 364/145 |
| 5,463,657 A | 10/1995 | Rice | 375/200 |
| 5,473,322 A | 12/1995 | Carney | 340/870.02 |
| 5,475,742 A | 12/1995 | Gilbert | 379/106 |
| 5,475,867 A | 12/1995 | Blum | 455/53.1 |
| 5,479,442 A | 12/1995 | Yamamoto | 375/206 |
| 5,481,259 A | 1/1996 | Bane | 340/870.03 |
| 5,488,608 A | 1/1996 | Flammer, III | 370/85.13 |
| 5,491,473 A | 2/1996 | Gilbert | 340/870.01 |
| 5,493,287 A | 2/1996 | Bane | 340/825.52 |
| 5,495,239 A | 2/1996 | Ouellette | 340/870.02 |

| | | | | | | | |
|---|---|---|---|---|---|---|---|
| 5,497,424 | A | 3/1996 | Vanderpool ................. 380/34 | 5,872,774 | A | 2/1999 | Wheatley, III et al. ...... 370/335 |
| 5,499,243 | A | 3/1996 | Hall ........................ 370/85.8 | 5,874,903 | A | 2/1999 | Shuey et al. ............ 340/870.02 |
| 5,500,871 | A | 3/1996 | Kato et al. ................. 375/208 | 5,875,183 | A | 2/1999 | Nitadori ..................... 370/328 |
| 5,511,188 | A | 4/1996 | Pascucci et al. ............ 395/600 | 5,875,402 | A | 2/1999 | Yamawaki ................... 455/502 |
| 5,519,388 | A | 5/1996 | Adair, Jr. ............... 340/870.02 | 5,884,184 | A | 3/1999 | Sheffer ....................... 455/521 |
| 5,521,910 | A | 5/1996 | Matthews ..................... 370/54 | 5,892,758 | A | 4/1999 | Argyroudis ................... 370/335 |
| 5,522,044 | A | 5/1996 | Pascucci et al. ......... 395/200.06 | 5,896,382 | A | 4/1999 | Davis et al. ................. 370/401 |
| 5,524,280 | A | 6/1996 | Douthitt et al. ................ 455/62 | 5,897,607 | A | 4/1999 | Jenney et al. ................. 702/62 |
| 5,525,898 | A | 6/1996 | Lee, Jr. et al. ............... 324/142 | 5,898,387 | A | 4/1999 | Davis et al. ............ 340/870.02 |
| 5,526,389 | A | 6/1996 | Buell et al. .................. 375/200 | 5,907,491 | A | 5/1999 | Canada et al. .......... 364/468.15 |
| 5,528,507 | A | 6/1996 | McNamara et al. ........ 364/483 | 5,907,540 | A | 5/1999 | Hayashi ....................... 370/315 |
| 5,528,597 | A | 6/1996 | Gerszberg et al. ......... 370/95.3 | 5,910,799 | A | 6/1999 | Carpenter et al. .......... 345/333 |
| 5,539,775 | A | 7/1996 | Tuttle et al. ................. 375/200 | 5,923,269 | A | 7/1999 | Shuey et al. ............ 340/870.02 |
| 5,541,589 | A | 7/1996 | Delaney ................. 340/870.02 | 5,926,103 | A | 7/1999 | Petite .................... 340/825.19 |
| 5,544,036 | A | 8/1996 | Brown, Jr. et al. .......... 364/145 | 5,926,531 | A | 7/1999 | Petite ........................ 379/144 |
| 5,546,424 | A | 8/1996 | Miyake ..................... 375/206 | 5,943,375 | A | 8/1999 | Veintimilla ................... 375/355 |
| 5,548,527 | A | 8/1996 | Hemminger et al. ......... 364/492 | 5,944,842 | A | 8/1999 | Propp et al. ................. 714/701 |
| 5,548,633 | A | 8/1996 | Kujawa et al. ................ 379/93 | 5,953,319 | A | 9/1999 | Dutta et al. ................. 370/238 |
| 5,553,094 | A | 9/1996 | Johnson et al. ............. 375/200 | 5,959,550 | A | 9/1999 | Giles .................... 340/870.02 |
| 5,555,508 | A | 9/1996 | Munday et al. .............. 364/492 | 5,960,074 | A | 9/1999 | Clark ........................ 379/310 |
| 5,559,870 | A | 9/1996 | Patton et al. ................ 379/107 | 5,963,146 | A | 10/1999 | Johnson et al. .......... 340/870.1 |
| 5,566,332 | A | 10/1996 | Adair et al. ................. 395/600 | 5,974,236 | A | 10/1999 | Sherman ................. 395/200.51 |
| 5,570,084 | A | 10/1996 | Ritter et al. ........... 340/825.05 | 5,986,574 | A | 11/1999 | Colton ................... 340/870.02 |
| 5,572,438 | A | 11/1996 | Ehlers et al. ................ 364/492 | 6,000,034 | A | 12/1999 | Lightbody et al. .......... 713/202 |
| 5,574,657 | A | 11/1996 | Tofte ......................... 364/510 | 6,028,522 | A | 2/2000 | Petite ........................ 340/641 |
| 5,590,179 | A | 12/1996 | Shincovich et al. ........ 379/107 | 6,034,988 | A | 3/2000 | VanderMey et al. ........ 375/202 |
| 5,592,470 | A | 1/1997 | Rudrapatna et al. ........ 370/320 | 6,035,201 | A | 3/2000 | Whitehead ................... 455/455 |
| 5,594,740 | A | 1/1997 | LaDue ........................ 379/59 | 6,041,056 | A | 3/2000 | Bigham et al. ............. 370/395 |
| 5,602,744 | A | 2/1997 | Meek et al. ........... 364/464.22 | 6,061,604 | A | 5/2000 | Russ et al. .................... 700/90 |
| 5,617,084 | A | 4/1997 | Sears ........................ 331/176 | 6,067,029 | A | 5/2000 | Durston ................ 340/870.03 |
| 5,619,192 | A | 4/1997 | Ayala .................... 340/870.02 | 6,073,169 | A | 6/2000 | Shuey et al. ................. 709/217 |
| 5,619,685 | A | 4/1997 | Schiavone ................... 395/500 | 6,073,174 | A | 6/2000 | Montgomerie et al. ..... 709/224 |
| 5,621,629 | A | 4/1997 | Hemminger et al. .......... 363/56 | 6,078,251 | A | 6/2000 | Landt et al. ............. 340/10.41 |
| 5,627,759 | A | 5/1997 | Bearden et al. ............. 364/483 | 6,078,785 | A | 6/2000 | Bush ............................ 455/7 |
| 5,631,636 | A | 5/1997 | Bane ..................... 340/825.69 | 6,078,909 | A | 6/2000 | Knutson ...................... 705/59 |
| 5,636,216 | A | 6/1997 | Fox et al. .................... 370/402 | 6,088,659 | A | 7/2000 | Kelley et al. ................ 702/62 |
| 5,640,679 | A | 6/1997 | Lundqvist et al. .......... 455/33.2 | 6,091,758 | A | 7/2000 | Ciccone et al. ............. 375/132 |
| 5,659,300 | A | 8/1997 | Dresselhuys et al. .. 340/870.02 | 6,100,817 | A | 8/2000 | Mason, Jr. et al. ...... 340/870.02 |
| 5,668,803 | A | 9/1997 | Tymes et al. ................. 370/312 | 6,112,192 | A | 8/2000 | Capek ........................ 705/59 |
| 5,668,828 | A | 9/1997 | Sanderford, Jr. et al. ... 375/202 | 6,124,806 | A | 9/2000 | Cunningham et al. . 340/870.02 |
| 5,673,252 | A | 9/1997 | Johnson et al. ............. 370/449 | 6,128,276 | A | 10/2000 | Agee ......................... 370/288 |
| 5,684,472 | A | 11/1997 | Bane ..................... 340/870.02 | 6,137,423 | A | 10/2000 | Glorioso et al. ........ 340/870.02 |
| 5,684,799 | A | 11/1997 | Bigham et al. .............. 370/397 | 6,150,955 | A | 11/2000 | Tracy et al. ............ 340/870.02 |
| 5,691,715 | A | 11/1997 | Ouellette ................ 340/870.09 | 6,154,487 | A | 11/2000 | Murai et al. ................. 375/150 |
| 5,692,180 | A | 11/1997 | Lee ............................ 395/610 | 6,160,993 | A | 12/2000 | Wilson ...................... 455/12.1 |
| 5,696,501 | A | 12/1997 | Ouellette et al. ...... 340/870.02 | 6,172,616 | B1 | 1/2001 | Johnson et al. ......... 340/870.12 |
| 5,696,765 | A | 12/1997 | Safadi ........................ 370/436 | 6,199,068 | B1 | 3/2001 | Carpenter ................... 707/100 |
| 5,696,903 | A | 12/1997 | Mahany ................. 395/200.58 | 6,208,266 | B1 | 3/2001 | Lyons et al. ............ 340/870.02 |
| 5,699,276 | A | 12/1997 | Roos ..................... 364/514 A | 6,218,953 | B1 | 4/2001 | Petite ........................ 340/641 |
| 5,714,931 | A | 2/1998 | Petite et al. ................. 340/539 | 6,233,327 | B1 | 5/2001 | Petite ........................ 379/155 |
| 5,715,390 | A | 2/1998 | Hoffman et al. ......... 395/188.01 | 6,246,677 | B1 | 6/2001 | Nap et al. ................... 370/346 |
| 5,717,604 | A | 2/1998 | Wiggins ................. 364/514 C | 6,249,516 | B1 | 6/2001 | Brownrigg et al. ......... 370/338 |
| 5,719,564 | A | 2/1998 | Sears .................... 340/870.02 | 6,363,057 | B1 | 3/2002 | Ardalan et al. ............. 370/252 |
| 5,745,901 | A | 4/1998 | Entner et al. ............... 707/103 | 6,393,341 | B1 | 5/2002 | Lawrence et al. .......... 700/286 |
| 5,748,104 | A | 5/1998 | Argyroudis et al. ..... 340/870.11 | 6,396,839 | B1 | 5/2002 | Ardalan et al. ............. 370/401 |
| 5,748,619 | A | 5/1998 | Meier ........................ 370/278 | 6,421,731 | B1 | 7/2002 | Ciotti, Jr. et al. ............ 709/238 |
| 5,751,914 | A | 5/1998 | Coley et al. .................. 395/51 | 6,430,268 | B1 | 8/2002 | Petite .......................... 379/39 |
| 5,751,961 | A | 5/1998 | Smyk ..................... 395/200.47 | 6,437,692 | B1 | 8/2002 | Petite et al. ................. 340/540 |
| 5,754,772 | A | 5/1998 | Leaf ...................... 395/200.33 | 6,446,192 | B1 | 9/2002 | Narasimhan et al. .......... 712/29 |
| 5,754,830 | A | 5/1998 | Butts et al. .................. 395/500 | 6,643,278 | B1 | 11/2003 | Panasik et al. .............. 370/330 |
| 5,757,783 | A | 5/1998 | Eng et al. ................... 370/315 | 6,657,549 | B1 | 12/2003 | Avery .................... 340/825.49 |
| 5,768,148 | A | 6/1998 | Murphy et al. ............. 364/492 | 6,684,245 | B1 | 1/2004 | Shuey et al. ................. 709/223 |
| 5,778,368 | A | 7/1998 | Hogan et al. ................. 707/10 | 6,751,563 | B2 | 6/2004 | Spanier et al. ............... 702/61 |
| 5,787,437 | A | 7/1998 | Potterveld et al. .......... 707/103 | 6,836,270 | B2 * | 12/2004 | Du .............................. 345/419 |
| 5,790,789 | A | 8/1998 | Suarez .................. 395/200.32 | 2001/0002210 | A1 | 5/2001 | Petite ........................ 379/155 |
| 5,790,809 | A | 8/1998 | Holmes ................. 395/200.58 | 2001/0024163 | A1 | 9/2001 | Petite ........................ 340/628 |
| 5,801,643 | A | 9/1998 | Williams et al. ........ 340/870.02 | 2001/0027456 | A1 * | 10/2001 | Lancaster et al. ........ 707/104.1 |
| 5,805,712 | A | 9/1998 | Davis .......................... 380/50 | 2002/0012323 | A1 | 1/2002 | Petite et al. ................. 370/252 |
| 5,808,558 | A | 9/1998 | Meek et al. ............ 340/870.01 | 2002/0013679 | A1 | 1/2002 | Petite ........................ 702/188 |
| 5,809,059 | A | 9/1998 | Souissi et al. ............... 375/202 | 2002/0019712 | A1 | 2/2002 | Petite et al. ................. 702/61 |
| 5,822,521 | A | 10/1998 | Gartner et al. ............ 395/200.6 | 2002/0019725 | A1 | 2/2002 | Petite ........................ 702/188 |
| 5,850,187 | A | 12/1998 | Carrender et al. ........ 340/10.42 | 2002/0026957 | A1 | 3/2002 | Reyman ........................ 137/39 |
| 5,862,391 | A | 1/1999 | Salas et al. ............. 395/750.01 | 2002/0027504 | A1 | 3/2002 | Davis et al. ................. 340/540 |

| | | | |
|---|---|---|---|
| 2002/0029226 A1* | 3/2002 | Li et al. | 707/104.1 |
| 2002/0031101 A1 | 3/2002 | Petite et al. | 370/310 |
| 2002/0094799 A1* | 7/2002 | Elliot et al. | 455/405 |
| 2002/0125998 A1 | 9/2002 | Petite et al. | 340/286.01 |
| 2002/0129138 A1* | 9/2002 | Carter | 709/224 |
| 2002/0145537 A1 | 10/2002 | Mueller et al. | 340/870.02 |
| 2002/0169643 A1 | 11/2002 | Petite et al. | 705/5 |
| 2003/0036810 A1 | 2/2003 | Petite | 700/9 |
| 2003/0036822 A1 | 2/2003 | Davis et al. | 700/295 |
| 2003/0202512 A1 | 10/2003 | Kennedy | 370/389 |
| 2004/0061701 A1* | 4/2004 | Arquie et al. | 345/440 |
| 2004/0113810 A1 | 6/2004 | Mason, Jr. et al | 340/870.02 |
| 2004/0172466 A1* | 9/2004 | Douglas et al. | 709/224 |
| 2005/0184881 A1 | 8/2005 | Dusenberry et al. | 340/870.02 |
| 2006/0022841 A1* | 2/2006 | Hoiness et al. | 340/870.02 |

FOREIGN PATENT DOCUMENTS

| | | |
|---|---|---|
| EP | 0 395 495 A1 | 10/1990 |
| EP | 0 446 979 A1 | 9/1991 |
| EP | 0 629 098 A2 | 12/1994 |
| GB | 2 118 340 A | 10/1983 |
| GB | 2 157 448 A | 10/1985 |
| GB | 2 186 404 A | 8/1987 |
| GB | 02 222 898 A | 3/1990 |
| GB | 2 237 910 A | 5/1991 |
| JP | 59-229949 | 12/1984 |
| JP | 02-67967 A | 3/1990 |
| JP | 4290593 A | 10/1992 |
| JP | 05-260569 | 10/1993 |
| JP | 8194023 A | 7/1996 |
| WO | 93/02515 A1 | 2/1993 |
| WO | 93/04451 A1 | 3/1993 |
| WO | 95/32595 A1 | 11/1995 |
| WO | 96/10856 A1 | 4/1996 |

OTHER PUBLICATIONS

Markwalter, Brian et al., "CEBus Network Layer Description", *IEEE*, 1989, 571-575, no month listed.

Newtown, Harry, *Newton's Telecom Dictionary*, Flatiron Publising, Inc., 10th Ed., 1996, LAN (1 of 1): Cebus Overview (1-3): Cebus Industry Council (1 of 1), no month listed.

Newtown, Harry, *Newton's Telecom Dictionary*, 10th Edition, 1996, 243, no month listed.

International Search Report issued in International Application No. PCT/US98/11170 Date of Mailing: Oct. 7, 1998.

International Search Report issued in International Application No. PCT/US98/19034 Date of Mailing: Feb. 1, 1999.

Internet Printout, http://www.ram.com BellSouth Wireless Data—Paging, Mobitex, Network, Business, Sep. 23, 1998: —MOBITEX®: The Heart of Every BellSouth Solution—MOBITEX Features and Services: RAM Mobile Data White Paper, Feb. 1997—Narrowband PCS Technologies: What are the Options: RAM Mobile Data White Paper, Nov. 1997—The Inherent Security of Data Over Mobitex Wireless Packet Data Networks, a RAM Mobile Data White Paper, Oct. 1995—Comparative Analysis of Coverage and Performance: RAM & Ardis, 1998.

Internet Printout, http://www.ardis.com "Ardis Two-Way, Wireless Data Communications," ARDIS, Sep. 23, 1998.

Internet Printout, http://www.ardis.com/RADIO "An Overview of Radio Coverage," Sep. 29, 1998 "Radio Propagation," Sep. 29, 1998 "Factors Affecting ARDIS Coverage," Sep. 29, 1998 "The ARDIS Network Compared to Other Systems," Sep. 29, 1998.

Internet Printout, http://www.ardis.com/RADIO "Radio Coverage," Sep. 29, 1998 "Glossary of Terms," Sep. 29, 1998 "Radio Propagation in Free Space," Sep. 29, 1998 "Real World Propagation Variations," Sep. 29, 1998 "Probability of Reception vs. Calculation," Sep. 29, 1998.

"MV-90 Read Only System" UTS Software Solutions for Utility Customers, (No Date). (No Page Numbers or Pages).

Rappaport, T.S., "Wireless Communications, Principles and Practice," Prentice Hall PTR, 1996, pp. 410-413, no month listed.

Brochure: TRF6900 Single-Chip RF Transceiver, Texas Instrument, 2001 ©, no month listed.

Corcoran, P.M. et al., "CEBus Network Access via the World-Wide-Web", *International Conference on Consumer Electronics*, Jun. 5-7, 1996, 236-237.

Corcoran, P.M. et al., "Browser-Style Interfaces to a Home Automation Network", *IEEE Trans. On Consumer Electronics*, Nov. 1, 1997 43(4), 1063-1069.

Norenkov, et al., *Telecommunication Technologies and Networks, Moscow Bauman Technical School*, 1988, (Signed for publication on Dec. 10, 1997), pp. 116-118, 80-87 [1] English Language Abstract Provided.

Brownrigg, E. Ph.D., "Developing the Information Superhighway Issues for Libraries", *Library Perspectives on NREN*, The National Research and Education Network, 1990, 55-63, no month listed.

Brownrigg, E.B., "The Internet as an External Economy: The Emergence of the Invisible Hand", *Library Administration and Management*, 1991, 95-97, no month listed.

Frankel, M.S., "Packet Radios Provide Link for Distributed Survivable C3 in Post-Attack Scenarios", *MSN*, Jun. 1983, 80-108.

Gower, N. et al., "Congestion Control Using Pacing in a Packet Radio Network", *IEEE Military Communications Conference*, 1982, 1, 23.1-1, 23-1-6, no month listed.

Jubin, J., "Current Packet Radio Networks Protocols", *IEEE Infocom Proceedings*, 1985, 86-92, no month listed.

Kahn, R.E., "The Organization of Computer Resources into a Packet Radio Network", *IEEE Transactions on Communications*, 1977, 25(1), 169-178, no month listed.

Kahn, R.E., et al., "Advances in Packet Radio Technology", *proceedings of the IEEE*, 1978, 66(11), 1468-1496, no month listed.

Lauer, G. et al., "Survivable Protocols for Large Scale Packet Radio Networks", *IEEE Global Telecommunications Conference*, 1984, 468-471, no month listed.

Lynch, C.A. et al., "Electronic Publishing, Electronic Imaging, and Document Delivery", *Electronic Imaging, International Electronic Imaging Exposition & Conference*, 1986, 662-667, no listed.

Lynch, C.A. et al., "The Telecommunications Landscape", 1986, 7 pages, no month listed.

Lynch, C.A. et al., "Routing, Repeating, Power Control and Directional Techniques", *Packet Radio Network*, Architectures, Protocols, Technologies and Applications, 1987, Ch 5, 105-129, 257-274, no month listed.

MacGregor, W. et al., "Multiple Control Stations in Packet Radio Networks", *IEEE Military Communications Conference*, 1982, 10.3-1-10.3-5, no month listed.

Shachan, N. et al., "A Packet Radio Network for Library Automation", *IEEE Military Communications Conference*, 1987, 2, 21.3. 1-21.3.7, no month listed.

Scacham, N. et al., "Future Directions in Packet Radio Technology", *IEEE Infocom Proceedings*, 1985, 93-98, no month listed.

Westcott, J.A., "Issues in Distributed Routing for Mobile Packet Radio Networks", *IEEE*, 1982, 233-238, no month listed.

Wescott, J. et al., "A Distributed Routing Design for a Broadcast Environment", *IEEE Military Communications Conference*, 1987, 10.4-1-10.4-5, no month listed.

"Packet Radio: Applications for Libraries in Developing Countries", *UDT Series on Data Communication Technologies and Standards for Libraries*, 1993, Ch 1-6, 87 pages, no month listed.

Johnson, D.B., "Routing in Ad Hoc Networks of Mobile Hosts", *IEEE*, 1995, 158-163, no month listed.

Jubin, J. et al., "The DARPA Packet Radio Network Protocols", *Proceedings of the IEEE*, 1987, 75(1), 21-32, no month listed.

Chlamtac, I. et al., "Optimizing the System of Virtual Paths", *IEEE ACM Transactions on Networking*, 1994, 2(6), 581-586.

Leung, V.C.M., "Internetworking Wireless Terminals to Local Area Networks Via Radio Bridges", *ICWC*, 1992, 126-129.

Pollini, G.P. et al., "Path Optimization Procedures for Efficient Routing of Information after an Inter-Switch Handover", *IEEE*, 1994, 1-5.

Rajagopalan, B. et al., "A New Responsive Distributed Shortest-Path Routing Algorithm", *ACM*, 1989, 237-246.

* cited by examiner

SYSTEM AND METHOD OF PROVIDING A GEOGRAPHIC VIEW OF NODES IN A WIRELESS NETWORK

FIELD OF THE INVENTION

The present invention relates to wireless networks for collecting data, and more particularly, to systems and methods of geographically visualizing fixed wireless network layouts and performance characteristics for such networks.

BACKGROUND OF THE INVENTION

The collection of meter data from electrical energy, water, and gas meters has traditionally been performed by human meter-readers. The meter-reader travels to the meter location, which is frequently on the customer's premises, visually inspects the meter, and records the reading. The meter-reader may be prevented from gaining access to the meter as a result of inclement weather or, where the meter is located within the customer's premises, due to an absentee customer. This methodology of meter data collection is labor intensive, prone to human error, and often results in stale and inflexible metering data.

Some meters have been enhanced to include a one-way radio transmitter for transmitting metering data to a receiving device. A person collecting meter data that is equipped with an appropriate radio receiver need only come into proximity with a meter to read the meter data and need not visually inspect the meter. Thus, a meter-reader may walk or drive by a meter location to take a meter reading. While this represents an improvement over visiting and visually inspecting each meter, it still requires human involvement in the process.

An automated means for collecting meter data involves a fixed wireless network. Devices such as, for example, repeaters and gateways are permanently affixed on rooftops and pole-tops and strategically positioned to receive data from enhanced meters fitted with radio-transmitters. Typically, these transmitters operate in the 902-928 MHz range and employ Frequency Hopping Spread Spectrum (FHSS) technology to spread the transmitted energy over a large portion of the available bandwidth.

Data is transmitted from the meters to the repeaters and gateways and ultimately communicated to a central location. While fixed wireless networks greatly reduce human involvement in the process of meter reading, such systems require the installation and maintenance of a fixed network of repeaters, gateways, and servers. Identifying an acceptable location for a repeater or server and physically placing the device in the desired location on top of a building or utility pole is a tedious and labor-intensive operation. Furthermore, each meter that is installed in the network needs to be manually configured to communicate with a particular portion of the established network. When a portion of the network fails to operate as intended, human intervention is typically required to test the effected components and reconfigure the network to return it to operation.

Thus, while existing fixed wireless systems have reduced the need for human involvement in the daily collection of meter data, such systems require substantial human investment in planning, installation, and maintenance and are relatively inflexible and difficult to manage. Therefore, there is a need for systems and methods for providing a geographic visualization of the wireless network layout and network information to simplify the maintenance and future planning of the network.

SUMMARY OF THE INVENTION

The present invention is directed to systems and methods of providing a geographic view of nodes in a wireless network as well as network information. In accordance with an aspect of the invention, a geographic view rendering tool receives geographic locations data for the nodes and renders a geographic view displaying the nodes at their corresponding geographic locations. The geographic locations data may include, for example, a set of longitude and latitude coordinates or a center point of a digital land parcel.

In accordance with another aspect of the invention, the geographic view may be displayed overlaying a digital map such that the geographic view displays an accurate position of each node on the digital map. The digital map may be, for example, an aerial photograph, a topographic map, an elevation map, a street map, or a land parcel.

In accordance with another aspect of the invention, the geographic view rendering tool receives network information and renders the geographic view displaying the network information. The network information may include, for example, node connections data, communication success rates for the nodes, and occurrences of communications events at the nodes. The network information may be shown by displaying the nodes and/or their connections in a variety colors and icons. A query may be submitted requesting that network information be displayed based on a specified criteria, and the geographic view may be rendered accordingly.

In accordance with another aspect of the invention, the view may be manipulated to display one or more sub-networks. Each such sub-network may include, for example, a group of nodes that are all associated with a particular network component such as, for example, a collector, transformer, feeder or substation. The sub-networks may be distinguished, for example, by color coding the connections between the nodes with each sub-network.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary systems and methods for gathering meter data are described below with reference to FIGS. 1-5. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate with each other. A collector is operable to automatically identify and register meters for communication with the collector. When a meter is installed, the meter becomes registered with the collector that can provide a communication path to the meter. The collectors receive and compile metering data from a plurality of meter devices via wireless communications. A communications server communicates with the collectors to retrieve the compiled meter data.

Figure 1:
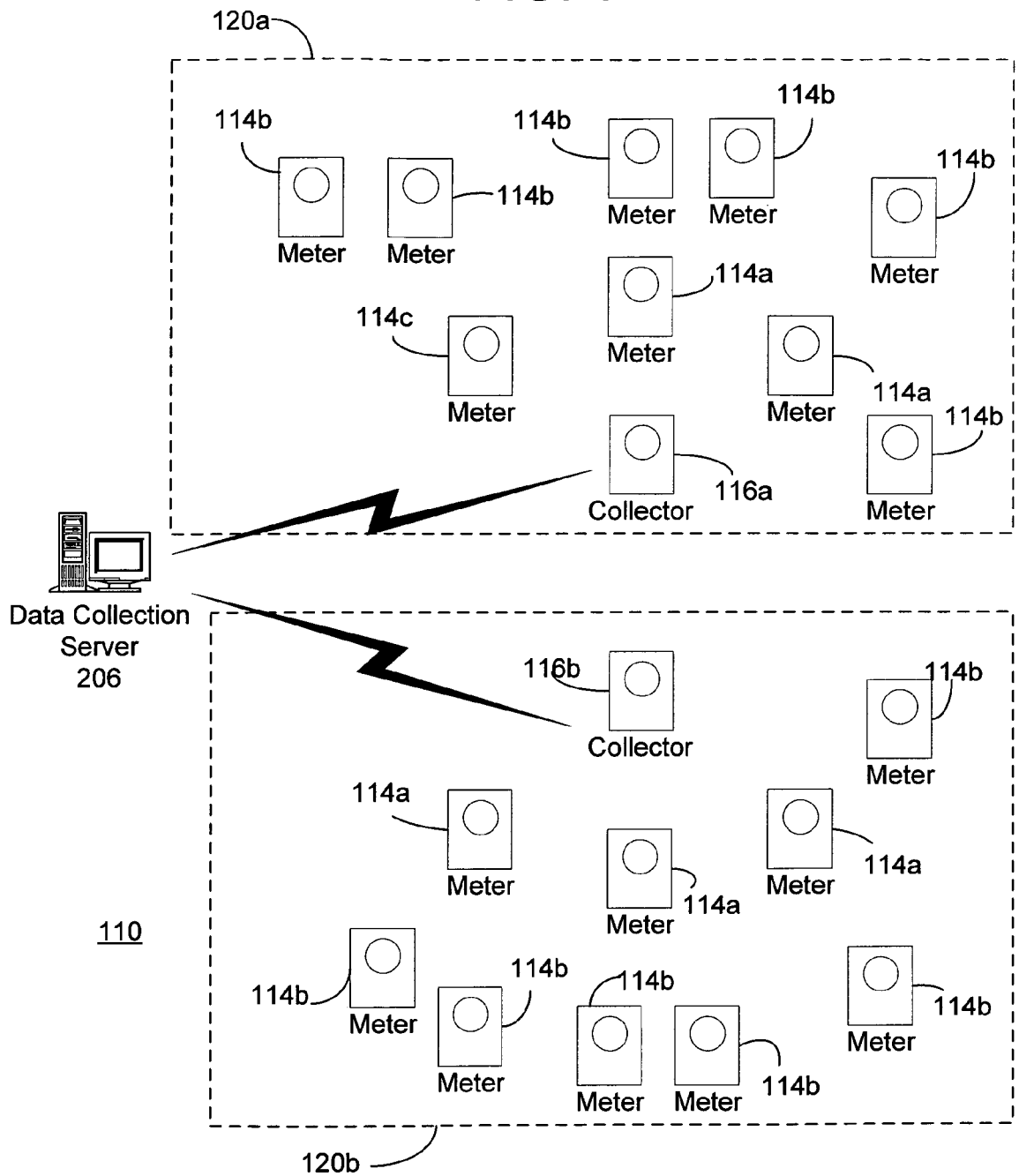
FIG. 1 is a diagram of a wireless system for collecting data from remote devices.

FIG. 1 provides a diagram of an exemplary metering system 110. System 110 comprises a plurality of meters 114, which are operable to sense and record usage of a service or commodity such as, for example, electricity, water, or gas. Meters 114 may be located at customer premises such as, for example, a home or place of business. Meters 114 comprise an antenna and are operable to transmit data, including service usage data, wirelessly. Meters 114 may be further operable to receive data wirelessly as well. In an illustrative embodiment, meters 114 may be, for example, a electrical meters manufactured by Elster Electricity, LLC.

System 110 further comprises collectors 116. Collectors 116 are also meters operable to detect and record usage of a service or commodity such as, for example, electricity, water, or gas. Collectors 116 comprise an antenna and are operable to send and receive data wirelessly. In particular, collectors 116 are operable to send data to and receive data from meters 114. In an illustrative embodiment, meters 114 may be, for example, an electrical meter manufactured by Elster Electricity, LLC.

A collector 116 and the meters 114 that are registered to the collector 116 define a subnet/LAN 120 of system 110. As used herein, meters 114 and collectors 116 maybe considered as nodes in the subnet 120. For each subnet/LAN 120, data is collected at collector 116 and periodically transmitted to a data collection server 206. The data collection server 206 stores the data for analysis and preparation of bills. The data collection server 206 may be a specially programmed general purpose computing system and may communicate with collectors 116 wirelessly or via a wire line connection such as, for example, a dial-up telephone connection or fixed wire network.

Generally, collector 116 and meters 114 communicate with and amongst one another using any one of several robust wireless techniques such as, for example, frequency hopping spread spectrum (FHSS) and direct sequence spread spectrum (DSSS). As illustrated, meters 114a are "first level" meters that communicate with collector 116, whereas meters 114b are higher level meters that communicate with other meters in the network that forward information to the collector 116.

Figure 2:
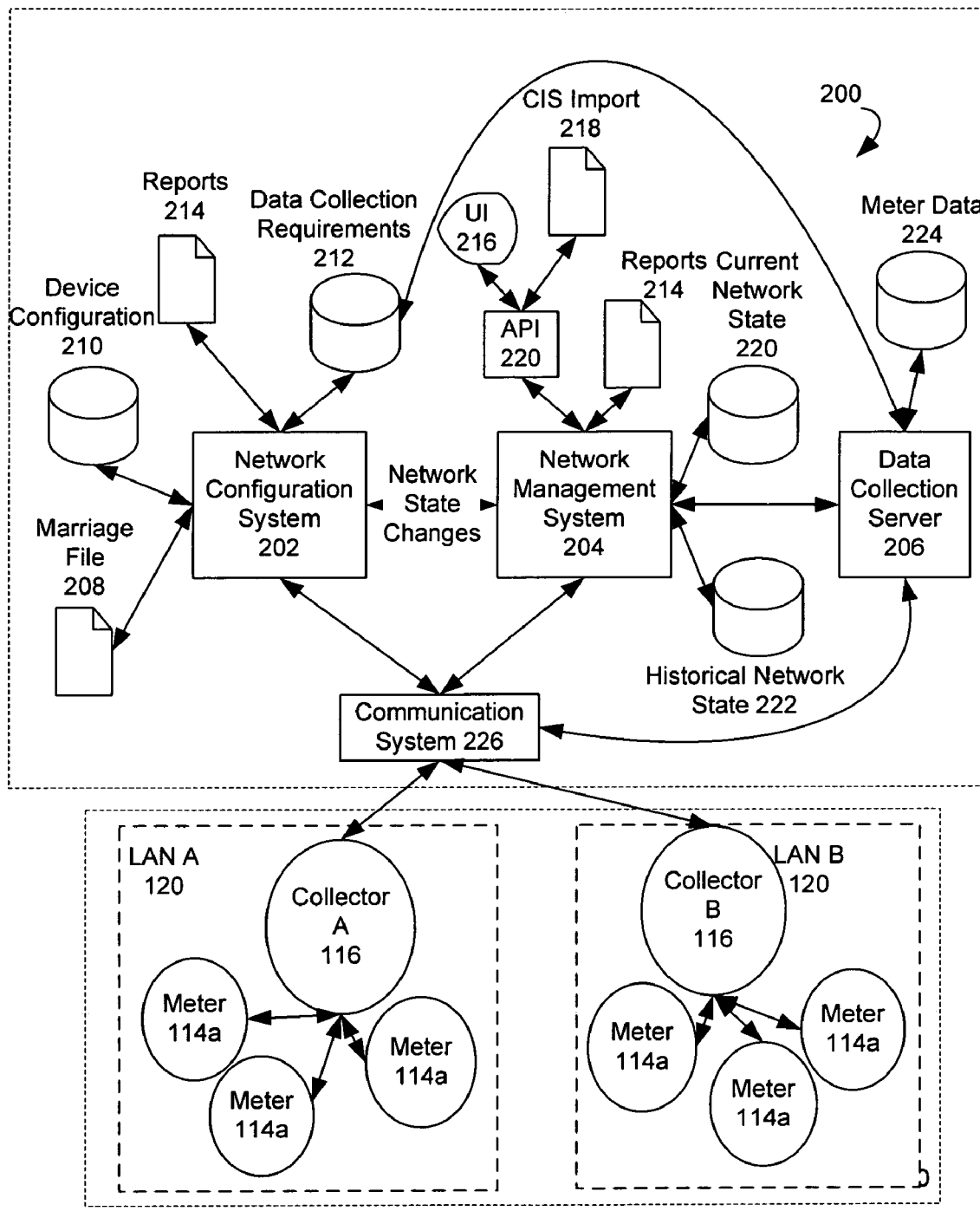
FIG. 2 expands upon the diagram of FIG. 1 and illustrates a system in which the present invention is embodied.

Referring now to FIG. 2, there is illustrated a system 200 in which the present invention may be embodied. The system 200 includes a network configuration system 202, a network management system (NMS) 204 and a data collection server 206 that together manage one or more subnets/ LANs 120 and their constituent nodes. The NMS 204 tracks changes in network state, such as new nodes registering/ unregistering with the system 200, node communication paths changing, etc. This information is collected for each subnet/LAN 120 and are detected and forwarded to the network configuration system 202 and data collection server 206.

In accordance with an aspect of the invention, communication between nodes and the system 200 is accomplished using the LAN ID, however it is preferable for customers to query and communicate with nodes using their own identifier. To this end, a marriage file 208 may be used to correlate a customer serial number and LAN ID for each node (e.g., meters 114a) in the subnet/LAN 120. A device configuration database 210 stores configuration information regarding the nodes. For example, in the metering system 110, the device configuration database may the time of use (TOU) program assignment for the meters 114a communicating to the system 200. A data collection requirements database 212 contains information regarding the data to be collected on a per node basis. For example, a user may specify that metering data such as load profile, demand, TOU, etc. is to be collected from particular meter(s) 114a. Reports 214 containing information on the network configuration may be automatically generated or in accordance with a user request.

The network management system (NMS) 204 maintains a database describing the current state of the global fixed network system (current network state 220) and a database describing the historical state of the system (historical network state 222). The current network state 220 contains data regarding current meter to collector assignments and other network information for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may be implemented in accordance with the present invention. In addition, the data collection requirements stored in the database 212 may be set via the user interface 216 or CIS 218.

The data collection server 206 collects data from the nodes (e.g., collectors 116) and stores the data in a database 224. The data includes metering information, such as energy consumption and may be used for billing purposes, etc. by a utility provider.

The network configuration system 202, network management system 204 and data collection server 206 communicate with the nodes in each subnet/LAN 120 via a communication system 226. The communication system 226 may be a Frequency Hopping Spread Spectrum radio network, a mesh network, a Wi-Fi (802.11) network, a Wi-Max (802.16) network, a land line (POTS) network, etc., or any combination of the above and enables the system 200 to communicate with the metering system 110.

Figure 3:
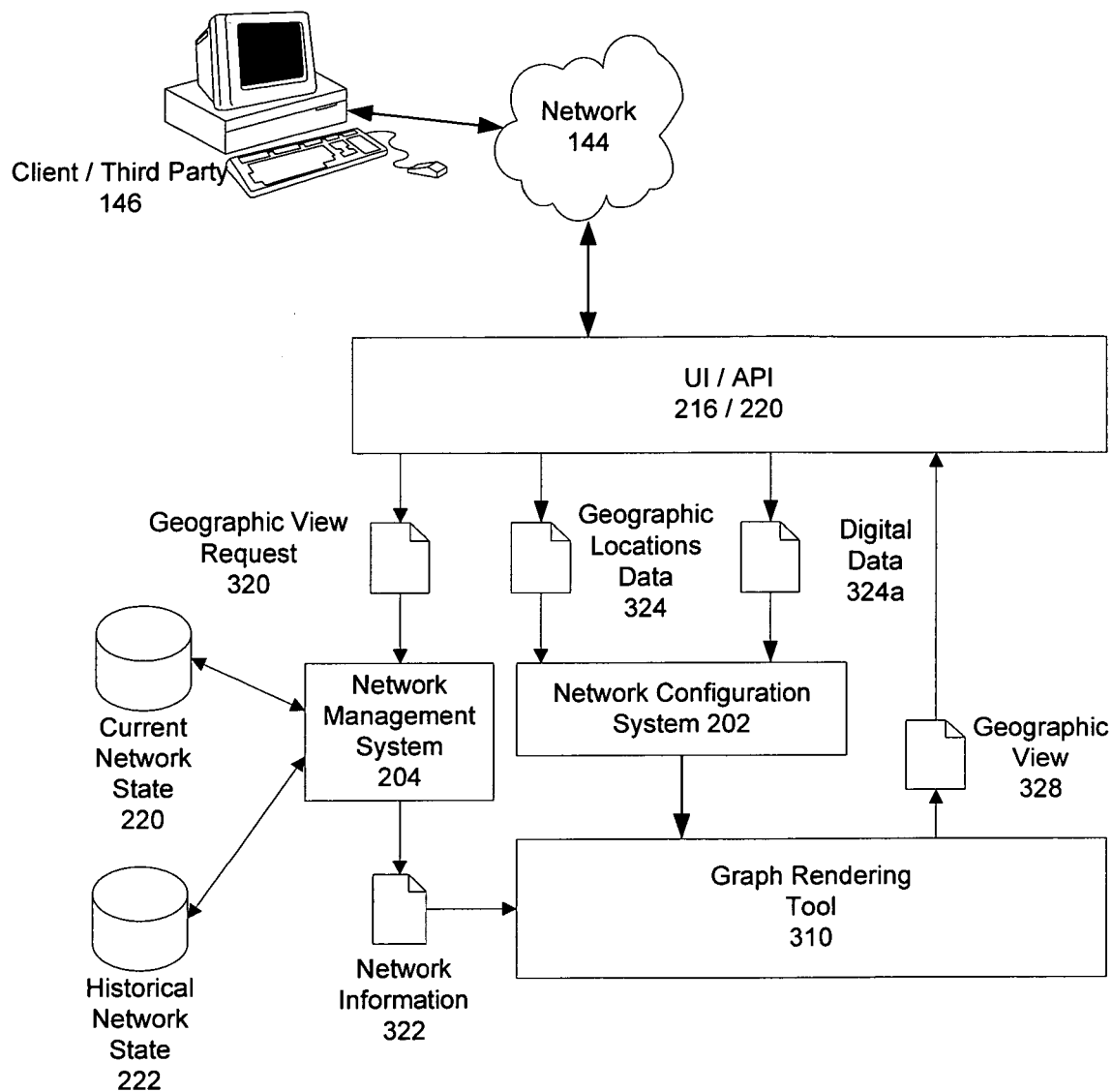
FIG. 3 shows an exemplary process of producing a geographic view of a network layout.

FIG. 3 shows an exemplary process of producing a geographic view of a network layout. Client 146 may submit a geographic view request 320 via user interface 216. The request 320 may be transferred over network 144, which may be a local area network (LAN) or a wide area network (WAN) such as the Internet. To enable request 320 to be placed over the Internet, the user interface 216 may be a browser-based interface that may be accessed via a web browser at client 146.

The request 320 is received by network management system 204, which, upon receiving the request, retrieves network information 322 from current and/or historical network state databases 220 and 222. Upon its compilation, the network information 322 is forwarded to graph rendering tool 310. The network information 322 may include, for example, node connections data, communication success rates for the nodes, and occurrences of communications events at the nodes. A communications event may be, for example, a node tampering incident, a node health related alarm, a low battery indication, a maintenance indication, a disconnection, a reconnection, a power outage, a power restoration, or a communications problem.

In addition to the network information 322, geographic location data 324 is also provided to the rendering tool 310 via network configuration system 202. The geographic location data 324 may include longitude and latitude coordinates for the nodes. Otherwise, if digital land parcels are available for the area, the geographic location data 324 may include digital data 324a such as the center point of a digital land parcel at which a node is located. The geographic location data 324 may be provided by a user via client 146 or by a third party such as, for example, a geo-coding service or tool. Upon receiving the geographic location data 324, the rendering tool 310 associates each node with a corresponding geographic location.

Generally, rendering tool 310 uses network information 322, geographic location data 324, and digital data 326 to render geographic view 328, which displays each node in the network layout at its corresponding geographic location. In addition to displaying the nodes, geographic view 328 may also display the network information 322. For example, geographic view 328 may display connections between the nodes, including paths between various network elements. Specifically, geographic view 328 may display a path from each meter to its registered collector. Additionally, geographic view 328 may distinguish "orphaned" nodes which are not connected to any other node in the network. Such orphaned nodes may be displayed with a uniquely shaped icon. For example, connected nodes may be displayed with a circular icon, while orphaned nodes may be displayed with a triangular icon.

Geographic view 328 may also display a number of sub-networks within the network layout. Each sub-network may include a group of nodes that are all associated with a particular network component such as, for example, a collector, transformer, feeder or substation. The sub-networks may be distinguished by color coding the connections between the nodes within each sub-network. Geographic view 328 may also display communication success rates for the nodes. For example, the icon for each node may be color coded according to its corresponding communications success rate. Geographic view 328 may also display visual alerts to indicate the occurrence of a communications event. For example, when an event occurs at a particular node within a specified time period, a plus ("+") icon may be displayed adjacent to the node.

In addition to current network information, geographic view 328 may be rendered based on historical network information stored in database 222 and also historical digital maps or other topographical information. Geographic view 328 may be displayed in accordance with geographic information systems (GIS) standards, thereby enabling the view to integrate well with third party tools that support rich GIS functionality. For example, such tools may be used to easily identify meters within a specified distance from another meter. The integration also allows the manipulation of a large display area, zooming in and out as necessary to examine the details.

Figure 4:
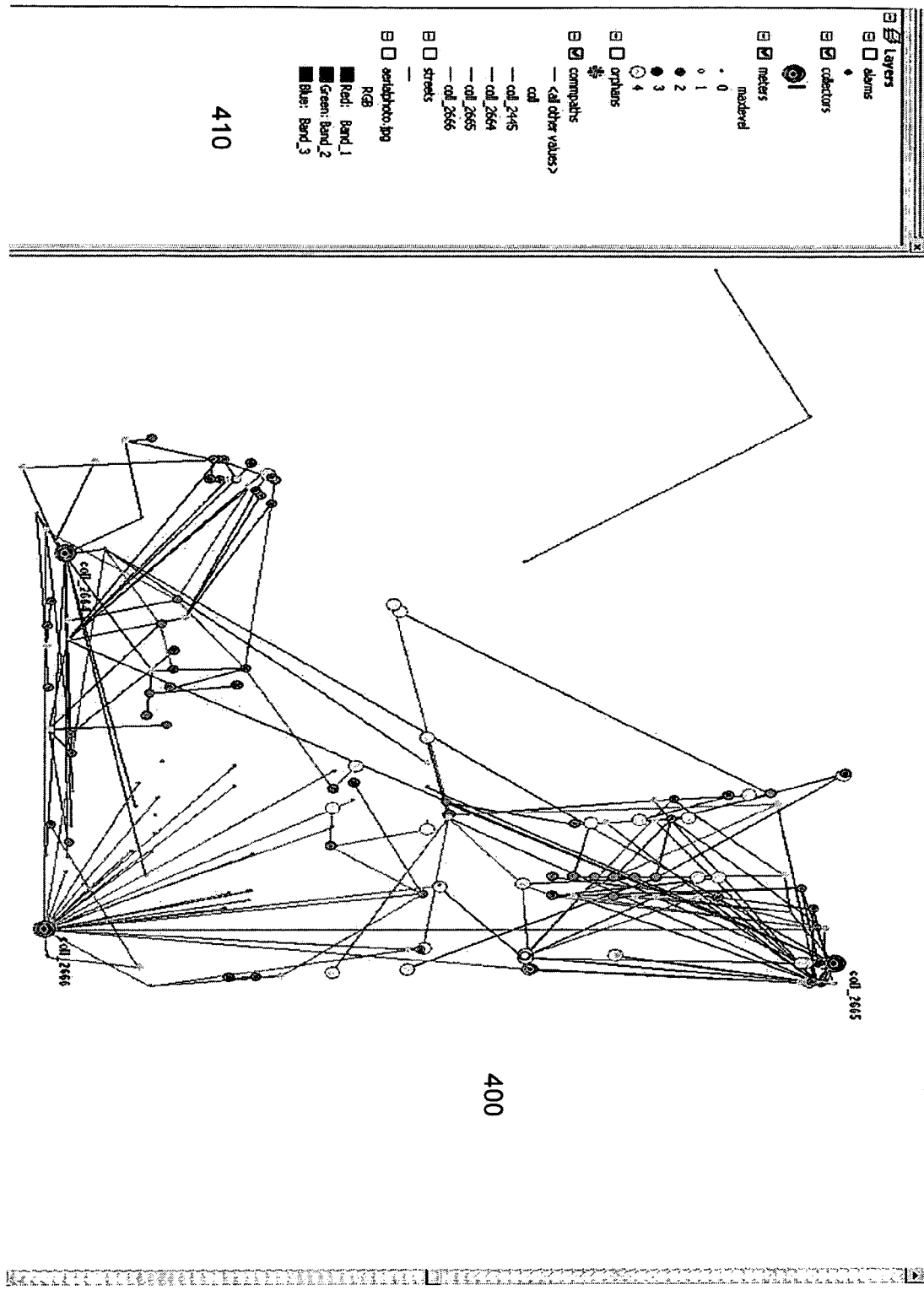
FIG. 4 illustrates an exemplary geographic view.

FIG. 4 illustrates an exemplary geographic view 400. View 400 includes a display selection bar 410, which enables various network elements and network information to be displayed. For example, selecting the collector check box within bar 410 causes collectors to be displayed within view 400. As shown, the collectors are displayed with a large circle icon. Additionally, connected meters are displayed with dot icons, while orphaned meters are displayed with plus shaped icons. The meter level check box of selection bar 410 is selected, which causes view 400 the size of each of each meter's icon to correspond to its associated meter level. Specifically, meters with the lowest corresponding meter level zero are displayed with the small dot, while meters with the highest corresponding meter level four are displayed with the large dot. Alternatively, the communications success rate check box could be selected, which would cause the size of each meter's icon to correspond to its associated communications success rate. Additionally, the color of each meter, rather than the size, may change according to various attributes.

Figure 5:
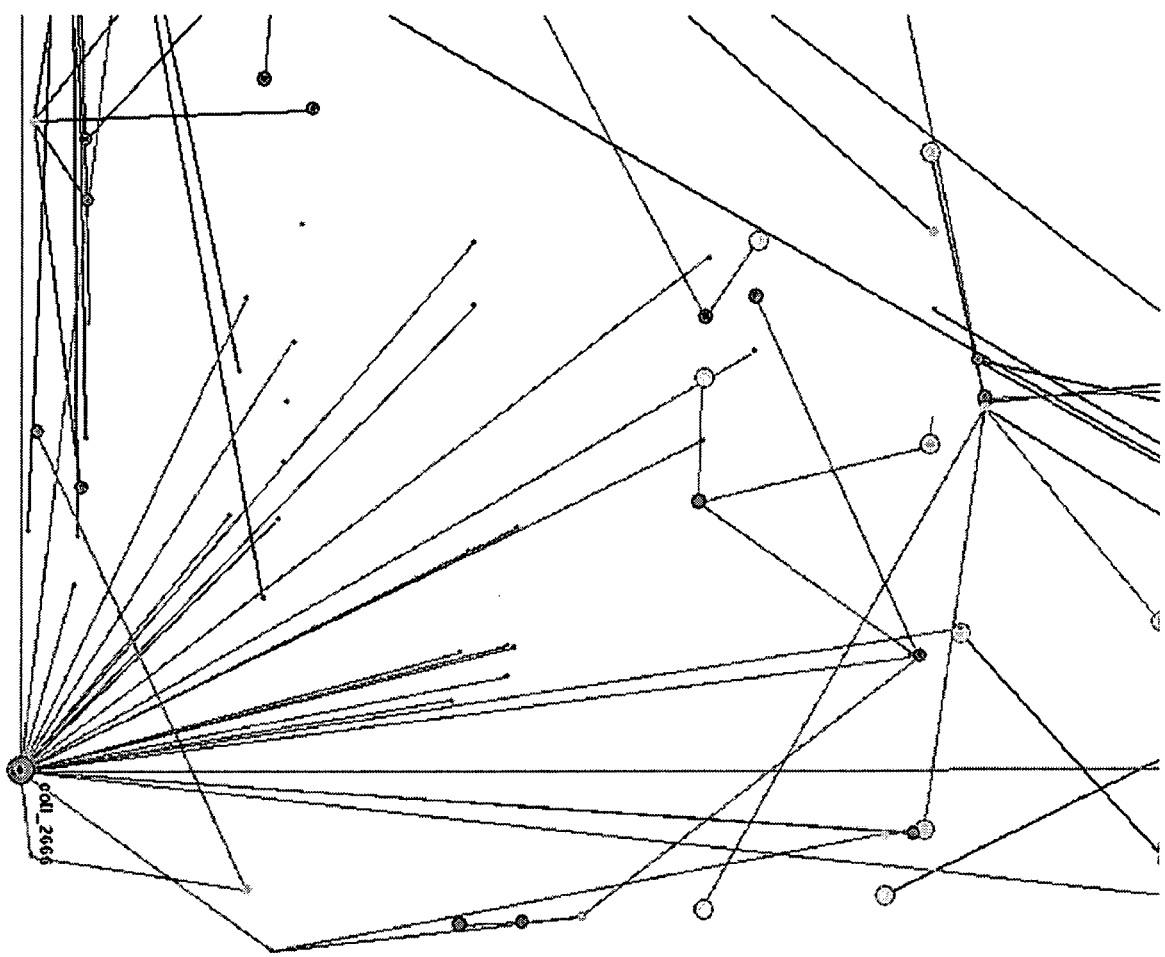
FIG. 5 illustrates an exemplary geographic view selected for a particular sub-network.

View 400 includes three collectors, the "2664" collector, the "2665" collector, and the "2666" collector. Each collector has a corresponding sub-network, which includes all meters that are registered to the collector. The connections between the meters within each sub-network are color coded. For example, connections between the meters in the "2664" sub-network may be displayed in yellow, connections between the meters in the "2665" sub-network may be displayed in blue, and connections between the meters in the "2666" sub-network may be displayed in red. View 400 may be manipulated to show more or less detailed views of the network layout. For example, FIG. 5 illustrates a close up view of the 2666 collector sub-network. The close up view of FIG. 5 may be selected, for example, by clicking on the 2666 collector with an attached mouse. Additionally, the view may be adjusted to focus on the path of an individual meter to the 2666 collector by, for example, clicking on the individual meter with the mouse.

Figure 6:
FIG. 6 illustrates an exemplary geographic view overlaying a aerial photograph.

Geographic view 328 may be displayed overlaying a digital map such as, for example, an aerial photograph, a topographic map, an elevation map, a street map, or a land parcel. For example, FIG. 6 illustrates geographic view 328 overlaying an aerial photograph. As shown, the aerial photograph shows man-made and geographical structures surrounding network elements. Displaying geographic view 328 in a "map view" overlaying a digital map provides a number of advantages with respect to network management. For example, if a meter is communicating poorly, the map view may be used to quickly and easily determine the cause of the problem. Specifically, an aerial photograph such as shown in FIG. 6 may be used to determine whether there is a man-made or geographic obstruction in the path of the meter. Additionally, by facilitating the assessment of relative and/or absolute distances among various network elements, the map view may be used to determine whether the problem is a function of distance. If the meter is located in close proximity to the collector or to a repeater, then the problem is probably not related to distance, and the map view may then be used to determine whether a tamper condition or a meter hardware problem is responsible. The map view may also be used to identify a cluster of nodes that are experiencing a similar problem, such as, for example, a power outage.

The map view is also useful to identify instances of meter theft or vandalism. In particular, the map view may be used to identify a meter that is stolen and then installed at a different location. For example, if an outlying meter is originally connected to a collector through several intermediate nodes, and is later directly connected or connected through fewer intermediate nodes, then this can be easily determined from the map view. Specifically, the map view may show an unexpected long line from the meter to the collector or to a new repeater node. Likewise, if a meter is moved further from a collector, then the map view may change to show a connection through several new repeaters. Furthermore, if the meter is moved so far away that it registers with a new collector, then the map view may change to show a long connection from the previous meter location to the new collector, thereby making the tamper self-evident.

Rendering tool 310 may be queried to generate a view 328 that includes network information based in specified criteria, and the view 328 may be rendered accordingly. For example, if a meter is stolen and then installed elsewhere, then the malfunction may be identified by querying for connections that are no longer than a specified distance. Additionally, the query may request meters that have communication characteristics that are significantly different from those of other meters located in close proximity.

Geographic view 328 may be used to facilitate the future planning and management of the network layout. For example, geographic view 328 may be used to easily and rapidly identify when several meters in close proximity to one another are experiencing communications problems. It may be then determined that new collectors and/or repeaters are needed in close proximity to those meters. Also, if an existing deployment of meters is to be expanded, then geographic view 328 may be used to identify locations at which new collectors and/or repeaters should be located. Specifically, geographic view 328 may be used to determine, based on maximum number of hops and the distances involved, whether an existing collector network would be capable of supporting the new meters at the new locations. Additionally, if new collectors and/or repeaters are needed, geographic view 328 may be used to determine their expected ranges.

While systems and methods have been described and illustrated with reference to specific embodiments, those skilled in the art will recognize that modification and variations may be made without departing from the principles described above and set forth in the following claims. Accordingly, reference should be made to the following claims as describing the scope of disclosed embodiments.

What is claimed:

1. A method for providing a geographic view of nodes in a wireless network, comprising:
   receiving geographic location data and operating status data for the nodes in the wireless network comprising a collector and a plurality of meters that communicate wirelessly with the collector, each of the meters having a wireless communication path to the collector that is either a direct path or an indirect path through one or more intermediate meters that serve as repeaters, the wireless communication paths between each meter and the collector defining a layout of the network, the geographic location data comprising a digital land parcel for each node;
   associating each node with a corresponding geographic location by computing a center point of the node's digital land parcel and associating the node with the computed center point; and
   rendering a geographic view of the nodes overlaying an aerial photograph, the geographic view displaying each of the nodes at their corresponding geographic location on the aerial photograph, the geographic view further displaying the operating status data directly within the geographic view without first requiring interaction with an item in the geographic view.

2. The method of claim 1, wherein receiving the geographic location data comprises receiving longitude coordinates and latitude coordinates.

3. The method of claim 1, further comprising:
   receiving node connection data; and
   displaying in the geographic view at least one connection between the nodes.

4. The method of claim 3, wherein displaying in the geographic view the at least one connection between the nodes comprises displaying in the geographic view a connection path from a meter to a collector.

5. The method of claim 1, further comprising:
   receiving node connection data; and
   displaying in the geographic view an orphaned node that is not connected to any of the other nodes.

6. The method of claim 1, wherein displaying the operating status data directly within the geographic view comprises displaying communications success rates for the nodes directly within the geographic view.

7. The method of claim 6, comprising displaying each of the nodes in a color corresponding to its communications success rate.

8. The method of claim 1, wherein displaying the operating status data directly within the geographic view comprises displaying in the geographic view a visual alert adjacent to a location of a communications event occurrence to indicate the occurrence.

9. The method of claim 8, comprising displaying in the geographic view the visual alert corresponding to at least one member of a group comprising a node tampering incident, a node health related alarm, a low battery indication, a maintenance indication, a disconnection, a reconnection, a power outage, a power restoration, and a communications problem.

10. The method of claim 1, further comprising displaying in the geographic view a plurality of sub-networks within the network layout, each sub-network displayed in a corresponding color.

11. The method of claim 10, comprising displaying a plurality of sub-networks each comprising nodes that are associated with a particular network component.

12. The method of claim 1, further comprising:
   receiving historical network information; and
   displaying in the geographic view the historical network information.

13. The method of claim 1, comprising rendering the geographic view according to geographic information systems standards.

14. The method of claim 1, further comprising:
   receiving a query to display network information in accordance with a specified criteria; and
   displaying the network information in accordance with the specified criteria.

15. The method of claim 1, further comprising rendering a geographic view that displays a tampered node at a new location that is different from a previous location at which the tampered node was displayed in a previously rendered geographic view.

16. A computer readable medium having computer executable instructions for performing the steps recited in claim 1.

17. A system for providing a geographic view of a network layout, comprising:
- a wireless local area network with a plurality of nodes comprising a collector and a plurality of meters that communicate wirelessly with the collector, each of the meters having a wireless communication path to the collector that is either a direct path or an indirect path through one or more intermediate meters that serve as repeaters, the wireless communication paths between each meter and the collector defining a layout of the network;
- a geographic view rendering tool that receives geographic location data and operating status data for the nodes the geographic location data comprising a digital land parcel for each node, associates each node with a corresponding geographic location by computing a center point of the node's digital land parcel and associating the node with the computed center point, and renders the geographic view overlaying an aerial photograph displaying the nodes at their corresponding geographic locations on the aerial photograph, the geographic view further displaying the operating status data directly within the geographic view without first requiring interaction with an item in the geographic view.

18. The system of claim 17, wherein the geographic location data comprises longitude coordinates and latitude coordinates.

19. The system of claim 17, wherein the geographic view displays network information collected from the wireless local area network.

20. The system of claim 19, wherein the network information comprises node communications paths between nodes.

21. The system of claim 19, wherein the geographic view displays a connection path from a meter to a collector.

22. The system of claim 19, wherein the operating status data comprises communication success rates for the nodes.

23. The system of claim 22, wherein the geographic view displays the nodes in colors corresponding to their associated communications success rates.

24. The system of claim 19, wherein the operating status data comprises data indicating an occurrence of a communications event.

25. The system of claim 24, wherein the geographic view displays a visual alert adjacent to a location of the communications event occurrence to indicate the occurrence.

26. The system of claim 24, wherein the communications event is at least one member of a group comprising a node tampering incident, a node health related alarm, a maintenance indication, a disconnection, a reconnection, a power outage, a power restoration, and a communications problem.

27. The system of claim 19, wherein the geographic view displays a plurality of sub-networks within the network layout, each sub-network displayed in a corresponding color.

28. The system of claim 27, wherein each sub-network comprises nodes that are associated with a particular network component.

29. The system of claim 19, wherein the network information is historical network information.

30. The system of claim 17, wherein the geographic view is rendered according to geographic information systems standards.

31. The system of claim 17, wherein the geographic view rendering tool can be queried to display the geographic view in accordance with a specified criteria.

32. The system of claim 17, wherein the geographic view displays a tampered node at a new location that is different from a previous location at which the tampered node was displayed in a previously rendered geographic view.

33. The system of claim 20, wherein the node communications paths changes dynamically, and the geographic view displays dynamic changes to the node communications paths.

34. The system of claim 33, further comprising a network management system that polls network elements to track the dynamic changes to the node communications paths.

35. The system of claim 33, further comprising a network management system that is notified by network elements of the dynamic changes to the node communications paths.

36. The system of claim 17, wherein the operating status data changes dynamically, and the geographic view displays dynamic changes to the operating status data.

37. The system of claim 36, further comprising a network management system that polls network elements to track the dynamic changes to the operating status data.

38. The system of claim 36, further comprising a network management system that is notified by network elements of the dynamic changes to the operating status data.

39. The method of claim 3, further comprising:
- receiving updated node connection data comprising data regarding dynamic changes to node communications paths; and
- displaying in the geographic view the dynamic changes to the node communications paths.

40. The method of claim 39, further comprising:
- polling, by a network management system, network elements to track the dynamic changes to the node communications paths.

41. The method of claim 39, further comprising:
- receiving at a network management system from a network element a notification of the dynamic changes to the node communications paths.

42. The method of claim 1, further comprising:
- receiving updated operating status data comprising dynamic changes to the operating status data; and
- displaying in the geographic view the dynamic changes to the operating status data.

43. The method of claim 42, further comprising:
- polling, by a network management system, network elements to track the dynamic changes to the operating status data.

44. The method of claim 42, further comprising:
- receiving at a network management system from a network element a notification of the dynamic changes to the operating status data.

* * * * *